Patented Nov. 16, 1937

2,099,090

UNITED STATES PATENT OFFICE 2,099,090

PROCESS OF MAKING HYDROCARBON RESINS

William L. Webb, Chicago, Ill., assignor to Standard Oil Company, Chicago, Ill., a corporation of Indiana No Drawing. Application February 7, 1936, Serial No. 62,816

6 Claims. (Cl. 260—2)

This invention relates to a process of producing synthetic resins and especially synthetic resins of the hydrocarbon type wherein reactive olefin hydrocarbons are polymerized or condensed at low temperature in the presence of catalysts such as aluminum chloride, boron chloride, boron fluoride, HCl and combinations of these catalysts with each other and with other metal halides. An essential property of the catalyst is that it be hydrolyzable by water, and any of the metal halides, preferably the fluorides and chlorides which possess this property may be used, either alone or in combination with other metal halides which act as promoters.

A specific application of the invention is in the polymerization of isobutylene to produce plastic resins, which are hydrocarbon substances of high molecular weight. An object of the invention is to improve the polymerization of olefin hydrocarbons with catalysts in order to produce resinous products of higher molecular weight than heretofore obtainable. Another object of the invention is to obtain high molecular weight resins from mixtures of olefin hydrocarbons. Other objects will be apparent from the following description.

I have now found that the reactivity of the lower olefins from which the high molecular weight products are made varies very widely. Thus, whereas the polymerization of isobutylene is substantially complete within a few minutes at —80° F., the normal butylenes polymerize very slowly at this temperature. In fact, butene-1 obtained by dehydration of normal butyl alcohol over heated alumina, gave only a trace of an oily polymer when treated with BF₃ at the saturation point for a period of 17 hours at —100° F.

A mixture of normal butylenes, however, without any diluent gave a 7% yield of a polymer containing considerable oily products when treated at the same temperature for 30 minutes. Propylene is likewise less reactive than isobutylene, giving a 25% yield of an oil when treated for 25 minutes with BF₃ at —100° F.

In order to obtain polymerization products having the desired rubber-like properties and high molecular weight, I have found it necessary to employ only those olefins which are extremely reactive and polymerizable at very low temperatures, below —40° F. When a reactive olefin hydrocarbon, such as isobutylene, is treated at a low temperature with a suitable catalyst such as boron tri-fluoride it has been found that an extremely rapid polymerization takes place, with the production of a resin having a molecular weight which may vary from several hundred up to 10,000 or 15,000. It has previously been found also that the molecular weight of the resulting resin is dependent to a great extent upon the temperature of the polymerization reaction and that in order to obtain material having the highest molecular weight it is necessary to carry out the reaction at a low temperature, preferably as low as —80 to —100° F.

The usual method of carrying out this reaction is as follows: A quantity of pure liquid isobutylene is cooled to a temperature of —80° F. by immersion in a bath of carbon dioxide snow. A small amount of boron tri-fluoride gas of the order of 0.1 to 0.5% is then bubbled into the hydrocarbon, care being taken to provide agitation. The reaction takes place rapidly as the concentration of boron tri-fluoride increases and the temperature may rise to —40° F. or higher, but higher temperatures than —40° F. should be avoided because products formed at higher temperatures are usually of lower molecular weight and therefore less valuable. In order to increase the ease of agitation and cooling, thereby preventing undesirable temperature rise, it is usually advisable to employ a diluent such as propane, butane or hexane or other inert hydrocarbon solvent.

When the reaction is complete or substantially so it has been the practice to allow the product to warm up to room temperature and then to distil off the boron fluoride and unreacted low-boiling hydrocarbons. The product is then usually washed with water and neutralized. I have now discovered that in the process of warming up the reaction product to room temperature or higher, undesirable reactions take place, with the production of lower molecular weight products and undesirable oils, accompanied by a loss in yield of the desired resin, especially if there are present less reactive olefins which yield inferior products at higher temperatures. I have further discovered that this difficulty can be prevented by treating or "quenching" the reaction mixture while still at a low temperature with a suitable fluid hydrolytic agent, such as certain of the alcohols and ketones. Ethyl alcohol, especially 95% ethyl alcohol containing 5% of water is eminently suited for the purpose and I may also use ammonia, glycol, glycerol, ethyl ether, methyl ether, methanol, isopropyl alcohol, acetone, methyl ethyl ketone, furfural, acetaldehyde, etc. I prefer to employ a small amount of water, usually less than 10% with any of the above compounds, providing that the freezing point is not raised thereby above −40° F., and I may use 60% to 95% ethyl alcohol.

In carrying out my process the reaction between the liquid olefin and the catalyst is conducted in the same manner as heretofore, employing a temperature of, preferably, −80 F. As an example, a liquefied gas mixture consisting mainly of a butane fraction obtained from cracking still gases and containing about 20% of isobutylene, together with other olefins, was cooled to a temperature of −80° F. by immersing the vessel in a bath of carbon dioxide snow. The hydrocarbon was rapidly agitated while 0.2% of $BF_3$ gas was introduced, causing a polymerization of the isobutylene as indicated by a slight rise in temperature to −70° F. After ten minutes the reaction was complete, the hydrocarbon was removed from the carbon dioxide cooling bath, and from 2–4% by volume of 95% ethyl alcohol was added with vigorous agitation. The unreacted butane hydrocarbons were then slowly evaporated by allowing the reaction mixture to warm up to about 35° F. When the reaction mixture had evaporated to about one-third of the original volume, an excess of 95% ethyl alcohol was added which caused a separation of the polymer product. The alcohol layer was removed and the polymer then heated to a temperature of 180–200° F. under vacuum to remove the remaining alcohol and any low boiling constituents.

The advantage of the above described "quenching" of the reaction mixture in the polymerization of isobutylene at low temperature is indicated by the following comparative results.

A quantity of liquefied hydrocarbon gases, mainly the butane and butylene fraction of cracking still gases, was treated with boron fluoride at −80° F. until polymerization at that temperature was substantially complete. The reaction mixture while yet cold was divided into two portions. One portion was allowed to warm up to room temperature, the unreacted hydrocarbon gases and boron fluoride evaporating. The other portion was treated before warming up with 95% ethyl alcohol. The alcohol immediately discharged the color of the reaction mixture and the mixture was then warmed up to room temperature with removal of unreacted hydrocarbons.

The polymerization product in both cases was diluted with hexane, neutralized and washed, and the hexane then removed by heating on the steam bath. The product was tested by adding to a lubricating oil having a viscosity within the range of S. A. E. 10. The viscosity of the oil containing 2% of the polymer made by quenching with alcohol was 245.9 seconds Saybolt universal at 100° F., whereas the viscosity of the lubricating oil containing 2% of the polymer made without alcohol quenching was 242.9 seconds Saybolt universal at 100° F. The color of the latter product was amber, whereas the product produced by alcohol quenching was colorless. There was also a greater improvement in viscosity index of the oil blended with the polymer from alcohol quenching.

Although I have described quenching the reaction at temperatures below −40° F., when polymerizing isobutylene mixtures, this temperature will vary with the specific reactive olefin employed. Thus, if isopropyl ethylene is treated with $BF_3$ in the presence of other pentene hydrocarbons which are less reactive, I may quench the reaction mixture at any temperature below 0° F. However, I prefer to quench the reaction at the lowest temperature at which the desired reaction is complete or nearly so.

Although I have described my invention by means of certain specific examples and applications thereof, I do not intend to be limited thereby. Thus I may carry out the polymerization process continuously, passing a stream of the liquefied olefin mixture through heat exchangers to cool it to the low temperature desired, introducing the catalyst, e. g. $BF_3$, into the stream while maintaining refrigeration to remove the heat of reaction, and then, when the desired reaction is complete, introducing a stream of alcohol and then heating the stream of hydrocarbons in suitable heat exchangers.

I claim:

1. In the process of making high molecular weight products from reactive olefins by polymerization of mixtures of the desired iso-olefin hydrocarbons with other olefins, in the presence of a metal halide catalyst hydrolizable by water, the temperature of said polymerization being maintained sufficiently low to permit the polymerization of the desired iso-olefins and substantially prevent the polymerization of other olefins, the improvement comprising deactivating said catalyst at a temperature below 0 F. after the desired polymerization reaction is substantially complete and before the temperature is allowed to rise to a point where the polymerization of other olefin hydrocarbons occurs.

2. In the polymerization of an olefin hydrocarbon fraction obtained from cracking still gases and boiling approximately within the range of the butanes and butylenes wherein said hydrocarbon mixture is subjected to the action of boron trifluoride at a temperature below −40° F., the improvement comprising treating said reaction mixture at a temperature below −40° F. with a fluid hydrolytic agent for said boron trifluoride after part of said olefin hydrocarbon has been polymerized, thereafter raising the temperature of said reaction mixture and removing unreacted olefin hydrocarbons from the product of said polymerization reaction.

3. In the process of making high molecular weight viscous resins by the polymerization with a metal halide catalyst hydrolyzable by water, of isobutylene in the presence of other olefin hydrocarbons susceptible to polymerization with said catalyst at temperatures above −40° F., the step comprising conducting the polymerization of the isobutylene at a temperature below −40° F., hydrolyzing said catalyst at said low temperature whereby it is rendered incapable of polymerizing further quantities of olefin hydrocarbons, and thereafter removing unreacted hydrocarbons by heating said reaction mixture.

4. In the process of making high molecular weight plastic resins by the polymerization at low temperatures with metal halide catalysts hydrolyzable by water of mixtures of olefin hydrocarbons, the improvement which comprises limiting the reaction to the most reactive olefins in said mixture by hydrolyzing said catalyst after the desired polymerization is substantially completed and before the temperature of the reaction mixture has increased to 0° F.

5. In the polymerization with metal halide catalysts hydrolyzable by water of isobutylene at temperatures below −40° F. in the presence of other olefins which are substantially unaffected by the said catalyst at the temperature employed but which react with said catalyst at higher temperatures to produce undesirable oily products, the improvement which comprises deactivating said catalyst at a low temperature below 0° F. with a fluid hydrolytic agent selected from the class consisting of ethyl alcohol, methanol, isopropyl alcohol, glycol, glycerol, and water-containing ethyl ether, methyl ether, acetone, methyl ethyl ketone, furfural and acetaldehyde, after said isobutylene is substantially polymerized but before the temperature of the reaction mixture is increased sufficiently to polymerize substantial quantities of said other olefins.

6. In the polymerization with metal halide catalysts hydrolyzable by water of isobutylene at temperatures below −40° F. in the presence of other olefins which are substantially unaffected by the said catalyst at the temperature employed but which react with said catalyst at higher temperatures to produce undesirable oily products, the improvement which comprises deactivating said catalyst at a low temperature below 0° F. with 60% to 95% ethyl alcohol after said isobutylene is substantially polymerized but before the temperature of the reaction mixture is increased sufficiently to polymerize substantial quantities of said other olefins.

WILLIAM L. WEBB.